June 11, 1957 — H. A. LEHMAN — 2,795,286
CROWDING SPEED ADAPTER DRIVE TRAIN FOR TRACTORS
Filed Jan. 17, 1955 — 5 Sheets-Sheet 1

Inventor
Herbert A. Lehman

June 11, 1957   H. A. LEHMAN   2,795,286
CROWDING SPEED ADAPTER DRIVE TRAIN FOR TRACTORS
Filed Jan. 17, 1955   5 Sheets-Sheet 2

Inventor
Herbert A. Lehman

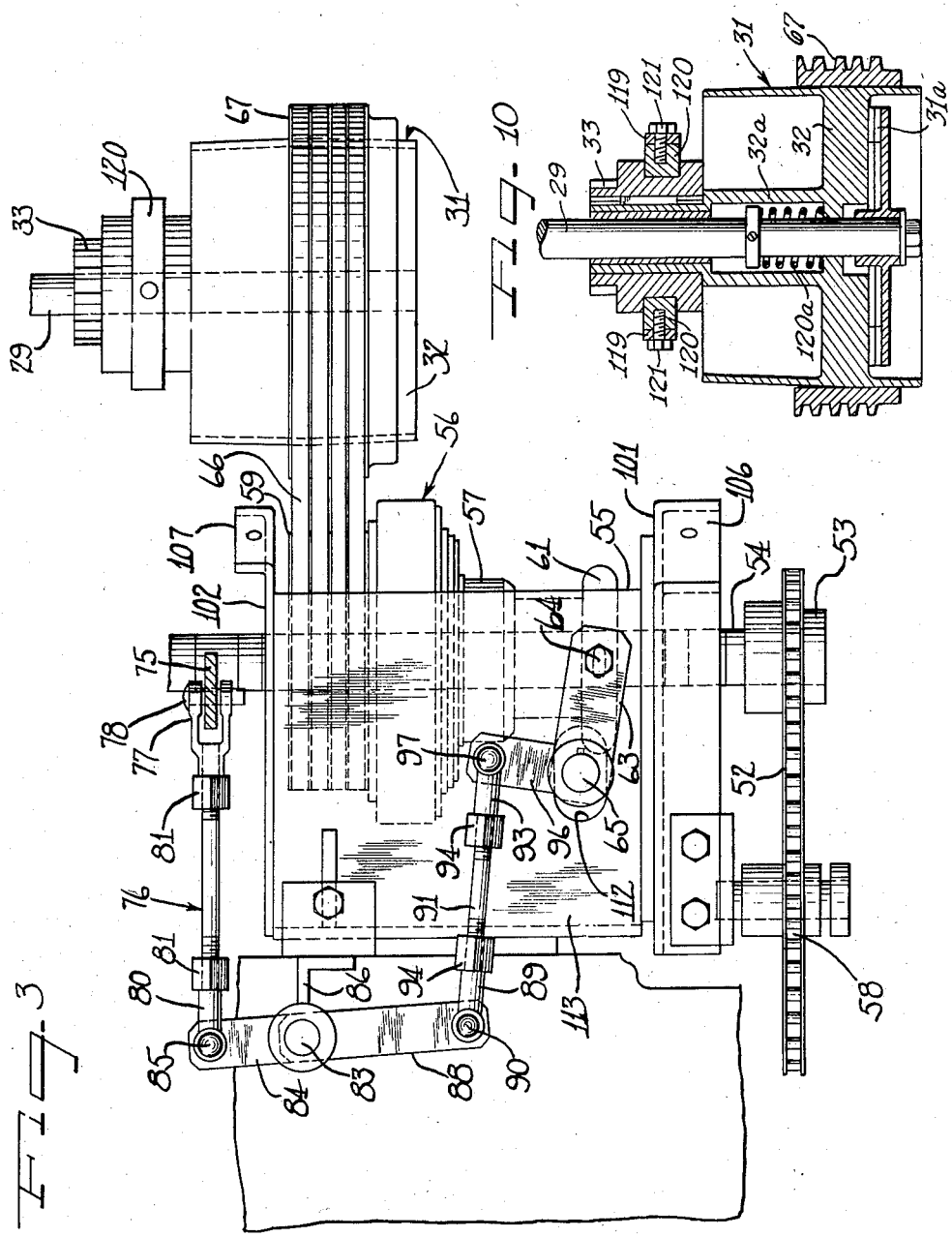

June 11, 1957 H. A. LEHMAN 2,795,286
CROWDING SPEED ADAPTER DRIVE TRAIN FOR TRACTORS
Filed Jan. 17, 1955 5 Sheets-Sheet 4
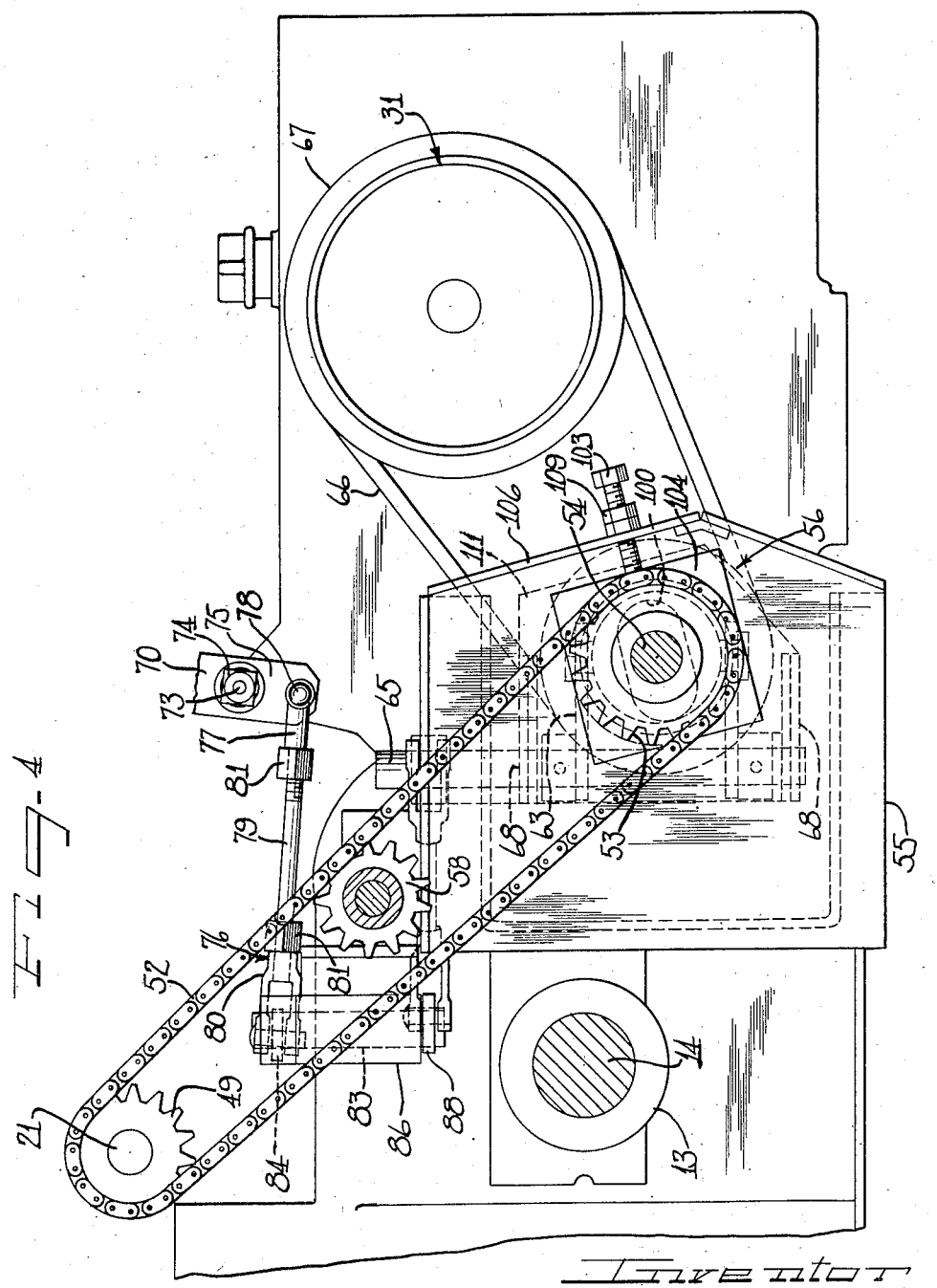
Inventor
Herbert A. Lehman

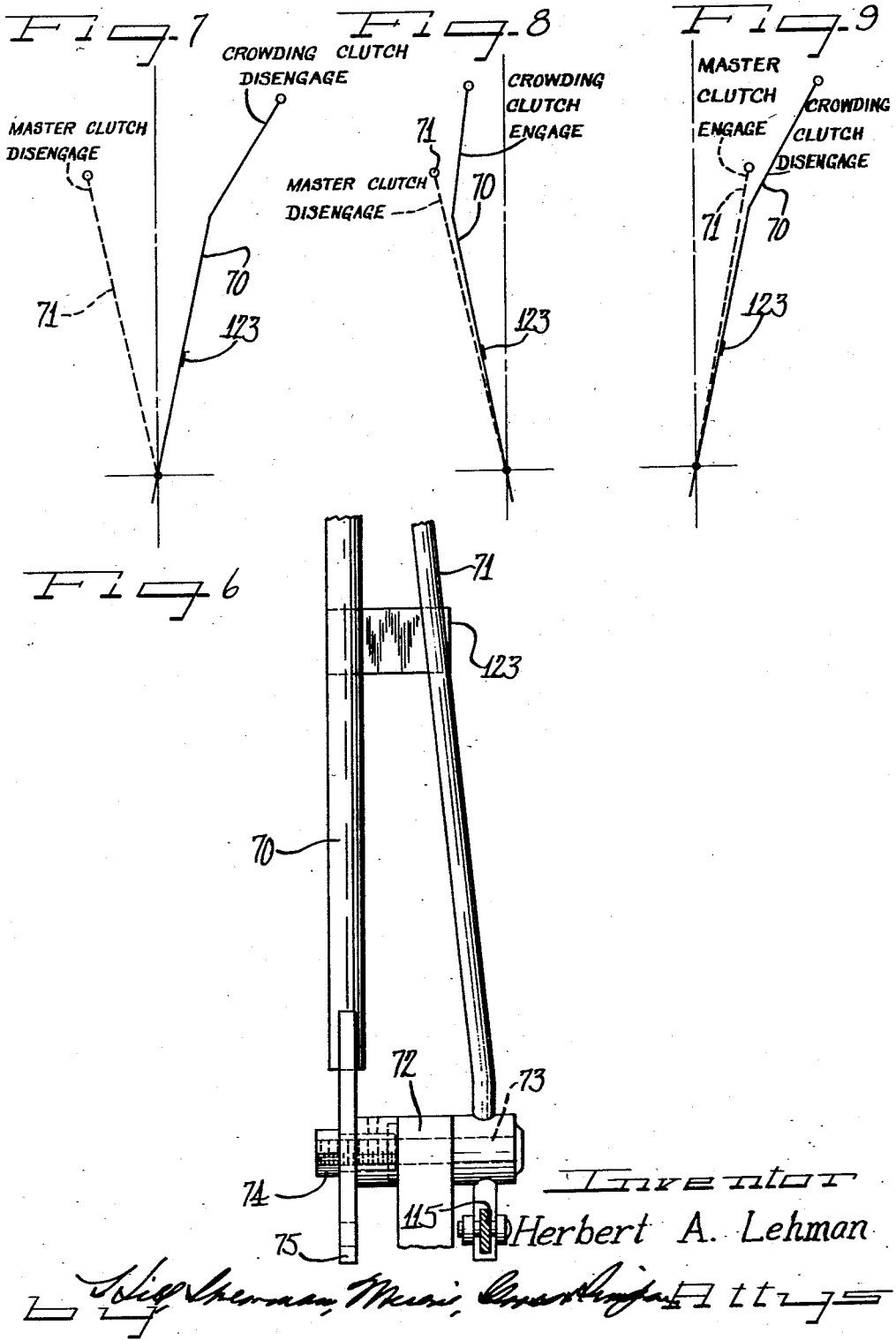

United States Patent Office 2,795,286
Patented June 11, 1957

2,795,286

CROWDING SPEED ADAPTER DRIVE TRAIN FOR TRACTORS

Herbert A. Lehman, Aurora, Ill., assignor to Barber-Greene Company, Aurora, Ill., a corporation of Illinois Application January 17, 1955, Serial No. 482,233

10 Claims. (Cl. 180—53)

This invention relates to improvements in tractors and drive transmissions therefor and more particularly relates to a crowding speed drive providing a selective reduced crowding speed drive through the standard tractor transmission.

A principal object of my invention is to provide a simple and improved crowding speed tractor drive through the standard tractor transmission, affording a lower operating range of selective speeds than the standard tractor speeds obtained through the tractor transmission.

A further object of my invention is to provide a crowding speed adapter particularly adapted for tractor mounted loaders providing an additional lower crowding speed drive range through the transmission than the standard selective drive range of the tractor transmission through the tractor transmission.

A further and more detailed object of my invention is to provide a crowding speed adapter particularly adapted for tractors and serving to crowd a loading device or scraping device through the standard tractor transmission but at a slower speed range than is obtained through the transmission.

Still another and more detailed object of my invention is to provide a simplified form of crowding speed adapter for tractors and the like in which the tractor transmission is selectively driven from one end of the engine shaft and provides a series of standard speed changes and a crowding speed adapter is driven from the opposite end of the engine shaft and provides a reduced speed drive for driving the transmission at a slower speed than the drive through the one end of the engine shaft.

Still another and more detailed object of my invention is to provide a crowding speed adapter for tractors and the like, wherein a clutch driven from one end of the engine shaft of the tractor has a selectively driven member having drive connection with the tractor transmission for driving the tractor at one speed range through the transmission, and wherein a second clutch driven from the opposite end of the engine shaft from the first clutch has selective drive connection with the driven member of the first clutch for driving the driven member at a lower speed than the engine speed and thus providing the selective crowding speed range through the tractor transmission, and wherein the operating levers for the clutches are interlocked to prevent the driving through one clutch when the other is engaged.

These and other objects of my invention will appear from time to time as the following specification proceeds and with reference to the accompanying drawings wherein:

Figure 3 is an enlarged fragmentary plan view of the crowding speed drive mechanism with certain parts broken away in order to more clearly illustrate my invention;

Figure 4 is a fragmentary view in side elevation with certain parts broken away and certain other parts shown in vertical section in order to illustrate certain details of the crowding speed drive, not shown in Figures 1 through 3;

Figure 5 is a diagrammatic view illustrating the shifting linkage for shifting the master clutch;

Figure 6 is an enlarged fragmentary end view of the operating levers for operating the main engine clutch and the crowding speed adapter clutch looking in the direction of line VI—VI of Figure 5;

Figures 7, 8 and 9 are diagrammatic views illustrating the operative positions of the clutch levers; and Figure 10 is a longitudinal sectional view taken through the master clutch.

Figure 1:
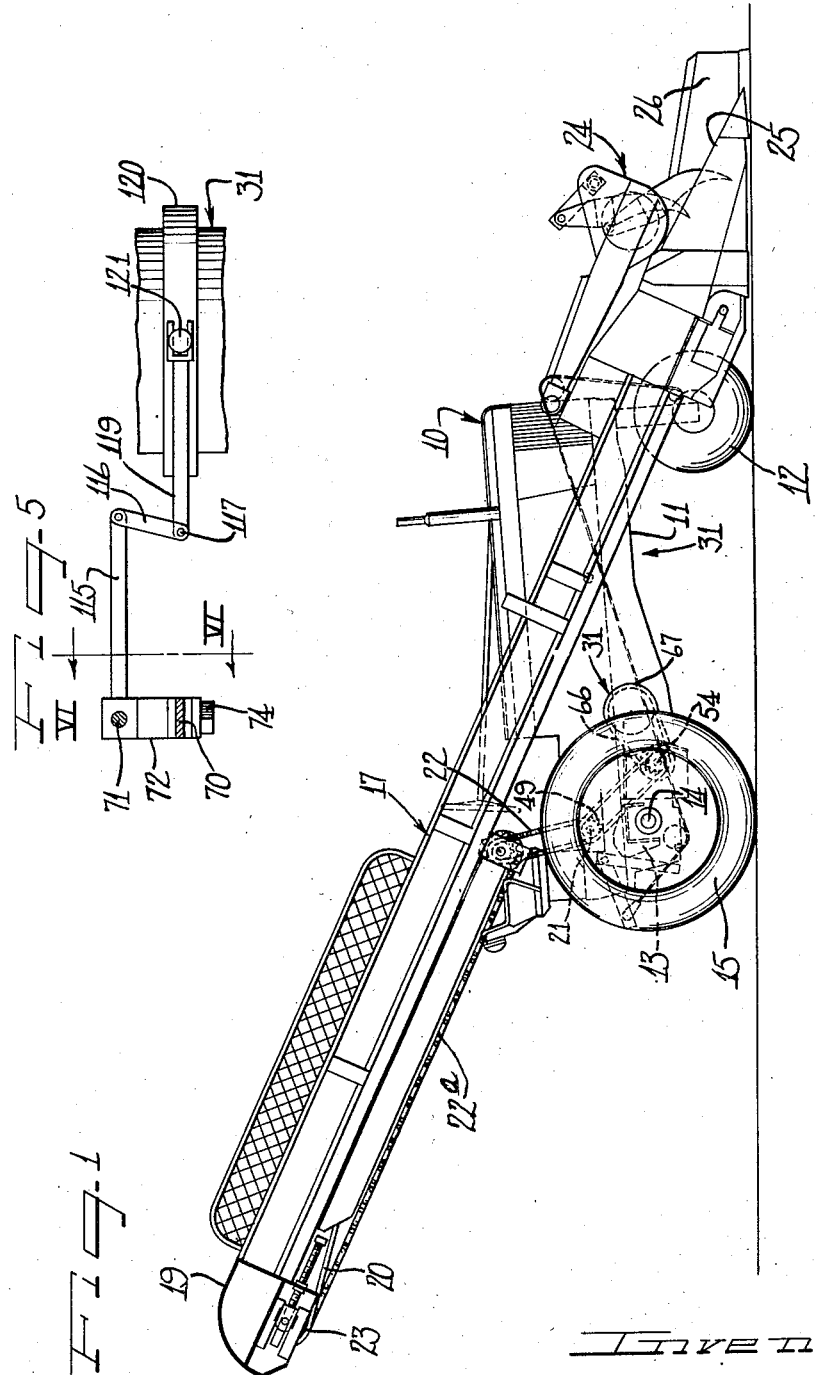
Figure 1 is a view in side elevation of a tractor mounted loader having a crowding speed adapter constructed in accordance with my invention embodied therein.

In Figure 1 of the drawings I have shown a tricycle type of farm tractor 10 having a main frame 11, a front steering wheel 12, a transverse axle housing 13, axles 14 journaled within said housing and having rear traction wheels 15 on the ends of said axles and driven thereby.

Extending along one side of the main frame 11 and within the limits of the associated traction wheel 15 and pivotally mounted on the rear axle housing 13 is an inclined elevating conveyor 17. The inclined elevating conveyor is like that shown in application Serial No. 414,145, filed by Raymore D. MacDonald, on March 4, 1954, and of common ownership, so need not herein be shown or described in detail except insofar as is necessary to make my present invention readily understandable. The elevating conveyor 17 includes an inclined trough-like frame 19 having a belt 20 extending upwardly therealong and driven from a transverse shaft 21 coaxial with the pivot shaft for the conveyor through chain and sprocket drives 22 and 22a driving a drive roller 23 at the upper end of the frame 19.

At the forward end of the frame 19 is a pick-up device 24 like that shown in the aforementioned MacDonald application Serial No. 414,145 to advance loose material on the ground to the receiving end of the conveyor 17 upon forward movement of the tractor 10 along the ground. The drive to said pick-up device is no part of my present invention so is not herein shown or described.

A divider 25 is shown as extending forwardly from the outer side of the frame 19 for dividing loose material encountered on the ground and progressing the same into the path of the pick-up device 24. An outwardly flared gathering or scraper blade 26 is shown as extending from the opposite side of the frame 19 from the divider 25 across the front steering wheel 12 for cooperating with the divider 25 and progressing earth or other material to be loaded into the path of the pick-up device 24, as in the aforementioned MacDonald application Serial No. 414,145.

Figure 2:
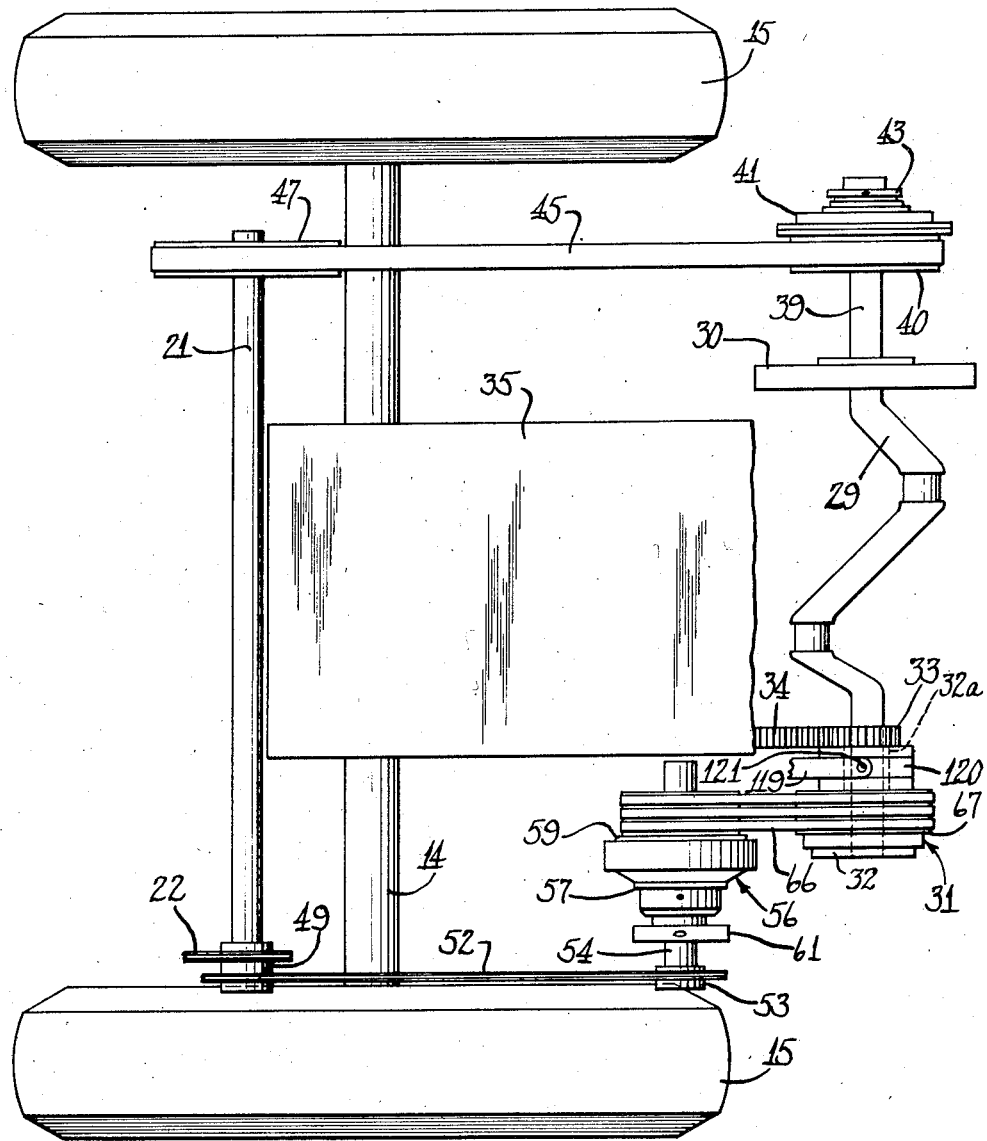
Figure 2 is a schematic view showing the crowding speed adapter of my invention driving the tractor transmission at a low range of crowding speeds.

In Figure 2, I have shown diagrammatically a crank-shaft 29 for a tractor engine (not shown). The crank-shaft 29 is herein shown as being for a two-cylinder tractor engine such as is commonly used in farm tractors. The crank-shaft 29 extends transversely of the tractor frame and has a flywheel 30 at one end and a clutch 31 at its opposite end.

The clutch 31 may be a well known form of friction disk clutch commonly used in farm tractors. The clutch 31 is shown in Figure 10 as including a driven member 32 freely mounted on the crankshaft 29 and rotatably driven from said crankshaft when friction disks 31a of the clutch are engaged. A drive pinion 33 is keyed or otherwise secured to a sleeve portion 32a of the driven member 32 and meshes with a gear 34 forming a drive gear for a selective transmission indicated generally by reference character 35. The transmission 35 may be a standard tractor transmission and serves to drive the axles 14 and wheels 15 through the usual differential (not shown) at the selective speeds afforded through the transmission.

The transmission 35 and the differential driven thereby may be of a well known form such as are commonly used for driving tractors and afford a selective speed range common to such tractors which may be five or more forward speeds and one reverse speed. The transmission and differential are of no part of my invention so need not herein be shown or described further.

Secured to and extending outwardly from the flywheel 30 and coaxial with the axis of rotation of the crankshaft 29 is a drive shaft 39 having a drive pulley 40 freely mounted thereon and driving said pulley through a selectively engageable clutch 41 shown as being a friction disk clutch engaged by a clutch yoke 43 operated by a suitable control lever, and not herein shown or described since it forms no part of my present invention.

The pulley 40 has a belt 45 trained thereabout driving a pulley 47 keyed or otherwise secured to one end of the transverse drive shaft 21 for driving conveyor belt 20 and gathering device 24 as in the aforementioned MacDonald application Serial No. 414,145, so not herein shown or described further. At the opposite end of the drive shaft 21 from pulley 47 is a sprocket 49.

The sprocket 49 serves to drive a chain 52 trained about a sprocket 53 disposed forwardly of the sprocket 49 and secured to a transverse shaft 54. The shaft 54 extends within and is journaled in a housing 55 having a clutch 56 thereon and driven thereby. An idler sprocket 58 is provided to engage the underrun of the chain 52 and maintain tension thereon.

The clutch 56 may be of a well known form of single plate disk clutch and includes a drive member 57 keyed or otherwise secured to the shaft 54, and a driven member 59 driven from said drive member when the clutch is engaged. A clutch collar 61 having rocking arms 63 pivoted thereto by pivot pins 64 is provided to engage and disengage said clutch. The rocking arms 63 are secured to a vertically extending rock shaft 65 pivotally mounted within the housing 55 on spaced bearing supports 68.

The driven member 59 is shown as being grooved to provide a pulley for driving a plurality of V-belts 66 trained about and driving a pulley 67 encircling and secured to the driven member 32 for the clutch 31. The bearing supports 68 are connected to move with the shaft 54 and clutch 56 when said shaft is moved in a take-up direction, as will hereinafter more clearly appear as this specification proceeds.

It may be seen from the foregoing that a selectively operable drive has been provided to drive the gear 33 and transmission 35 from the crankshaft 29 through the clutch 31, or to drive the gear 33 and transmission 35 from the opposite end of the crankshaft 29 from the clutch 41 at a reduced speed through the clutch 56. The tractor wheels 15 may thus be driven through the transmission 35 at the selective speeds thereof and may also be driven through the transmission 35 at a plurality of selective reduced speeds through the clutch 56 driving the gear 33 at a lower speed than the speed of the crankshaft 29. The second clutch 56 therefore forms a crowding drive clutch for effecting a selected series of low crowding speeds for driving the tractor wheels 15 and crowding the deflector 26 and divider 25 into loose material to be loaded.

Referring now to the linkage connection for operating the clutches 56 and 31 and the interlocking connection between the operating lever for the clutch 31 and the operating lever for the clutch 56, to disengage one clutch when the other clutch is engaged and vice versa, a crowding speed clutch lever 70 is provided to engage and disengage the clutch 56, while a master clutch lever 71 is provided to engage and disengage the clutch 31. The levers 70 and 71 are shown in Figure 6 as being mounted on opposite sides of a bracket 72 on a transverse pivot pin 73. A nut 74 threaded on the end of said pivot pin is provided to retain said levers in position on said pin.

The lever 70 has a depending lever arm 75 having a link 76 pivoted thereto. The link 76 includes a clevis 77 pivoted on the arm 75 on a pivot pin 78, and a rod 79 threaded within the clevis 77 at one end and threaded within a spaced clevis 80 at its opposite end. Lock nuts 81 are threaded on the ends of the rod 79 adjacent the clevises 77 and 80 for locking said rod in position with respect to said clevises and forming a means to accommodate adjustment of the link 76. The link 76 serves to rock a rock shaft 83 through a lever arm 84, pinned or otherwise secured to the inner end of the rock shaft 83. A pivot pin 85 pivotally connects the clevis 80 to the inner end of the lever arm 84. The rock shaft 83 is pivotally mounted in a bracket 86 and has a lever arm 88 pinned or otherwise secured to its lower end. The lever arm 88 extends outwardly from the shaft 83 and is pivotally connected to a clevis 89 as by a pivot pin 90. The clevis 89 has a link or rod 91 threaded therein, the opposite end of which rod is threaded within a clevis 93. Lock nuts 94 are provided to lock the rod 91 to the associated clevises 89 and 93, respectively, and accommodate adjustment of the link formed by said clevises and rod as desired. The clevis 93 is pivotally connected to the inner end of a lever arm 96 by a pivot pin 97. The lever arm 96 is shown as being keyed or otherwise secured to the rock shaft 65 for rocking said shaft and the lever arm 63 to effect movement of the clutch collar 61 along the shaft 54 in a counterclockwise direction toward the clutch 56 to effect engagement of the clutch and in an opposite direction to effect disengagement of the clutch.

The shaft 54, clutch 56 and pulley 59 are mounted for take-up movement along inclined slots 100 formed in opposite side plates 101 and 102 of the housing 55. Suitable take-up means such as take-up screws 103, abutting bearing supports 104 for the shaft 54 are provided to take up tension on the belts 66 as required. The bearing supports 104 may be slidably guided in the side plates 101 and 102. The take-up screws 103 are shown as being threaded within flanges 106 and 107 of the respective side plates 101 and 102 into engagement with the bearing support blocks 104 to slidably move said blocks along the respective side plates 101 and 102. A lock nut 109 is provided to lock the adjusting screw 103 in position.

Tension may be maintained on the drive chain 52 by the idler 58 which may be adjustably moved to maintain the drive chain 52 under the proper tension.

It should here be noted that the link formed by the clevis 89, link 91, and clevis 93 is adjustable to accommodate the movement of the shaft 54 in a take-up direction without affecting the linkage connection from the low crowding speed lever to the clutch collar 61.

It should further be noted that the rock shaft 65 and the brackets 68 forming a bearing support therefor extend outwardly from a plate 111 secured to and movable with the outer bearing support 104 and that the rock shaft 65 is adjustably movable with the shaft 54 along a slot 112 formed in an upper cover plate 113 for the housing 55.

The master clutch lever 71 is shown as being connected with the clutch 31 to operate the same, by means of a link 115 having pivotal connection with a lever arm 116 mounted on a rock shaft 117. The rock shaft 117 has a clutch yoke 119 pivotally mounted thereon having pivotal connection with a clutch collar 120 by means of pivot pins 121. The lever arm 116 has operative connection with the clutch yoke 119 so that when the master clutch lever 71 is pivoted in a direction which in Figures 5 and 6 is a forward or clockwise direction and in Figures 7, 8 and 9 is a counterclockwise direction, the driven member 32 will be moved along the shaft 29 by the collar 120 to disengage the disks 31a of the master clutch 31. When the master clutch lever 71 is moved in an opposite direction, the friction disks 31a of the master clutch will be engaged under the bias of a spring 120a. In a contrary manner, when the crowd clutch lever 70 is pivotally moved in a direction toward the operator the clutch 56 will be disengaged.

The crowd clutch lever 70 is shown as having a stop 123 thereon projecting inwardly therefrom and beyond the master clutch lever 71 to engage the master clutch lever 71 and move the master clutch lever 71 to a disengaged position upon movement of the clutch lever 70 from the position shown in Figure 7 to that shown in Figure 8.

In a contrary manner as the master clutch lever 71 is moved from the disengaged position shown in Figure 8 to the engaged position shown in Figure 9, said clutch lever will engage the stop 123 and move the crowd clutch lever 70 in a direction to disengage the clutch 56.

The clutches 32 and 56 are thus alternately operable and one clutch is always disengaged as the other is engaged so as to avoid the tendency to drive the gear 33 at the drive speeds of the two clutches.

It may be seen from the foregoing that the tractor 10 may be driven along the ground through the standard selective speed reduction transmission through the clutch 31, driving the transmission drive gear 33 at the speed of the crankshaft 29 and that when it is desired to crowd the divider 25 and scraper 26 into the earth or other material being picked up by the pick-up dvice 24, it is merely necessary to shift the crowd speed clutch lever 70 in a forward direction, bringing the stop 123 in engagement with the master clutch lever 71 and disengaging the master clutch 31 as the crowding clutch 56 is engaged. This will effect a drive to the transmission drive gear 33 at a reduced speed from the speed of rotation of the crank shaft 29 through the reduction attained by the pulley 40 driven from the flywheel end of the crankshaft 29, belt 45, pulley 47 driven therefrom, the transverse drive shaft 21, serving to drive the conveyor belt 20, the sprocket 49, chain 52 and sprocket 53 driving the shaft 54 and that when the crowding speed clutch 56 is engaged and the master clutch 31 is disengaged that the driven member 32 of the master clutch 31 will be directly driven through the belts 66 and the tractor may be driven through the standard transmission through a series of selected reduced speeds from the speeds when the tractor is driven through the transmission directly through the crankshaft 29 and master clutch 31.

It may further be seen that a simple and improved crowding speed adapter has been provided for tractors, and particularly adapted for tractors having loaders associated therewith for crowding the loader into the material to be loaded at a far lower speed than when driven directly through the master tractor drive clutch, and that the adapter may readily be adapted to various forms of tractors with no alteration in the standard transmission by merely providing a second or crowding clutch and a drive means from this clutch to the driven member and driven gear of the master clutch.

It will be understood that various modifications and variations of the present invention may be effected without departing from the spirit and scope of the novel concepts thereof, as defined by the claims appended hereto.

I claim as my invention:

1. In a crowding speed reduction and in combination with a tractor having rear drive wheels and at least one front steering wheel, a frame supported on said wheels, an engine having a crankshaft, a clutch on said crankshaft and including a driven member having a transmission drive gear thereon, a lever for engaging said clutch to drive said driven member and transmission drive gear at the speed of said crankshaft, and a crowding speed adapter for driving said driven member and transmission drive gear at a slower speed than the speed of said crankshaft comprising a second clutch having a driving member and a driven member, a drive connection from said latter driven member to said driven member of said first clutch, a reduced drive connection to said second clutch from the opposite end of said crankshaft from that of said first clutch, a lever for engaging said second clutch, and an interengaging connection between said levers to disengage one clutch upon engagement of the other.

2. In a tractor drive having a frame having rear drive wheels and at least one front steering wheel and having a plural speed transmission for driving said wheels, an engine on said frame having a transverse crankshaft, an elevating conveyor extending along one side of said frame, a drive connection from one end of said crankshaft for driving said elevating conveyor including a transverse shaft driven from said crankshaft at a reduced speed, a drive connection from the other end of said crankshaft for driving said rear drive wheels including a clutch including a driving member and a driven member, a gear driven by said driven member and driving said plural speed transmission, and a selective drive connection from said transverse shaft to said driven member for driving said gear at a reduced speed from the speed of said crankshaft when the clutch is disengaged.

3. In a tractor, a frame, rear drive wheels and a front steering wheel on said frame, an engine on said frame having a transverse crankshaft, an elevating conveyor extending along one side of said frame, a speed reduction drive connection from one end of said crankshaft for driving said elevating conveyor including a transverse shaft, a drive connection from the other end of said crankshaft for driving said rear drive wheels including a clutch, a transmission gear driven by said clutch at the speed of said crankshaft, a plural speed transmission driven by said transmission gear, a lever for engaging and disengaging said clutch, and a selective drive connection from said transverse shaft to said gear for driving said gear at a reduced speed from the speed of rotation of said engine shaft including a second clutch, a drive connection from said transverse shaft to said second clutch, a lever for engaging and disengaging said second clutch, a drive connection from said second clutch to said gear, and an interengaging connection between said clutch levers for disengaging one clutch lever as the other is engaged and vice versa.

4. In a transmission device particularly adapted for tractors having a frame, rear drive wheels and at least one front steering wheel on said frame for supporting and driving the same, an engine on said frame having a transversely extending crankshaft, a drive member on one end of said crankshaft, a clutch on the other end of said crankshaft, a transmission drive gear driven by said clutch for driving a selective change speed transmission having driving connection wtih said rear drive wheels, a transverse shaft for driving a conveyor, a selective reduction drive connection from said drive member to said transverse shaft, a second clutch driven by said transverse shaft, and a reduction drive connection from said second clutch for driving said gear at a reduced speed from the speed of rotation of said crankshaft.

5. In a transmission device particularly adapted for tractors having a frame, rear drive wheels and at least one front steering wheel on said frame for supporting and driving the same, an engine on said frame having a transversely extending crankshaft, a drive member on one end of said crankshaft, a first clutch on the other end of said crankshaft, a transmission drive gear driven by said first clutch for driving a selective change speed transmission having driving connection with said rear drive wheels, a transverse shaft, a selective reduction drive connection from said drive member to said transverse shaft, a second clutch driven by said transverse shaft, and a reduction drive connection from said second clutch for driving said transmission drive gear at a reduced speed from the speed of rotation of said crankshaft, individual levers for engaging and disengaging said clutches and an interengaging connection between said levers for disengaging one clutch as the other is engaged to effect a drive to said transmission drive gear at the speed of said crankshaft through said first clutch and to effect a reduced drive to said gear through said second clutch.

6. In a tractor, a frame, rear drive wheels and a front steering wheel on said frame for supporting and driving the tractor, an engine on said frame having a transverse crankshaft having a drive member on one end thereof, an elevating conveyor extending along one side of said frame and having a pick-up device thereon for gathering material into said conveyor, a selective drive connection from said drive member to said conveyor comprising a transverse shaft driven from said drive member at a reduced speed, a change speed transmission for driving said traction wheels, a selective drive connection from the end of said crankshaft opposite from said drive member for driving said transmission comprising a gear coaxial with said crankshaft and a clutch for selectively connecting said gear with said crankshaft, and a selective drive connection from said transverse shaft to said gear for driving said gear at a reduced speed from the speed of rotation of said crankshaft comprising a second clutch, a drive connection from said transverse shaft to said second clutch, and a drive connection from said second clutch to said gear through an element of said first clutch.

7. In a tractor, a frame, rear drive wheels and a front steering wheel on said frame for supporting and driving the tractor, an engine on said frame having a transverse crankshaft having a drive member on one end thereof, an elevating conveyor extending along one side of said frame and having a pick-up device thereon for gathering material into said conveyor, a selective drive connection from said drive member to said conveyor comprising a transverse shaft driven from said drive member at a reduced speed, a change speed transmission for driving said traction wheels, a selective drive connection from the end of said crankshaft opposite from said drive member for driving said transmission comprising a gear coaxial with said crankshaft and a clutch for selectively connecting said gear with said crankshaft, and a selective drive connection from said transverse shaft to said gear, for driving said gear at a reduced speed from the speed of rotation of said crankshaft comprising a second clutch, a drive connection from said transverse shaft to said second clutch, a drive connection from said second clutch to said gear through an element of said first clutch, individual operating levers for each of said clutches for engaging and disengaging the same, one operating lever moving in one direction to engage its respective clutch and the other operating lever moving in an opposite direction to engage its respective clutch, and a stop on one of said operating levers for engaging the other of said operating levers and moving the other of said operating levers in a clutch disengaging direction as the one operating lever is moving in a clutch engaging direction.

8. In a crowding speed reduction and in combination with a tractor, an engine having a crankshaft, a clutch at one end of said crankshaft having a driving member driven by said crankshaft and a driven member driven by said driving member when the clutch is engaged, a transmission selectively driven by said crankshaft through said driven member when said clutch is engaged, for driving the tractor at a traveling speed, a transverse shaft, a reduction drive connection from the opposite end of said crankshaft from that of said clutch for driving said transverse shaft at a reduced speed from the speed of said crankshaft, a second clutch having a driving member and a driven member, a drive conection from said transverse shaft to said driving member of said second clutch, and a drive connection from said driven member of said second clutch to said driven member of said first clutch for driving said driven member of said first clutch at said reduced speed and thereby providing a crowding speed drive for said tractor.

9. In a tractor, a frame, rear drive wheels and at least one front steering wheel for supporting and driving said tractor, an engine of said frame having a transverse crankshaft, a drive member on one end of said crankshaft, a first clutch on the other end of said crankshaft having a driven member, an elevating conveyor extending along one side of said frame, a selective drive connection from said drive member to said elevating conveyor, change speed transmission gearing for driving said rear drive wheels, a second drive connection from the opposite end of said crankshaft from said drive member, for selectively driving said change speed transmission gearing including a drive gear coaxial with said crankshaft and driven by said crankshaft through said driven member upon engagement of said first clutch, and a selective drive connection from said first mentioned drive connection, for driving said drive gear at a reduced speed through said drive member upon disengagement of first clutch and effecting a low crowding speed drive connection to said drive gear and transmission and including a second clutch for driving said driven member upon engagement of said second clutch, and an interlocking connection between said clutches to disengage one clutch as the other is engaged.

10. In a tractor having rear traction wheels and axles, an engine having a transversely extending crankshaft, a clutch at one end of said crankshaft having a driven member selectively driven from said crankshaft through said clutch, means for engaging and disengaging said clutch, a change speed transmission driven from said driven member for driving said axles and traction wheels from said crankshaft upon engagement of said clutch, a second clutch, and a crowding speed adapter driven from the opposite end of said crankshaft from said first clutch and driving said driven member and transmission through said second clutch at a lower speed than the drive through said first clutch, upon disengagement of said first clutch.

References Cited in the file of this patent

UNITED STATES PATENTS

| | | |
|---|---|---|
| 1,386,396 | Cornelison | Aug. 2, 1921 |
| 1,481,816 | Tracy | Jan. 29, 1924 |
| 1,684,705 | Humphreys | Sept. 18, 1928 |
| 1,957,221 | McCray | May 1, 1934 |
| 2,541,625 | Webster | Feb. 13, 1951 |
| 2,661,935 | Willard | Dec. 8, 1953 |

FOREIGN PATENTS

| | | |
|---|---|---|
| 64,600 | Sweden | Feb. 14, 1928 |